United States Patent Office 3,168,372
Patented Feb. 2, 1965

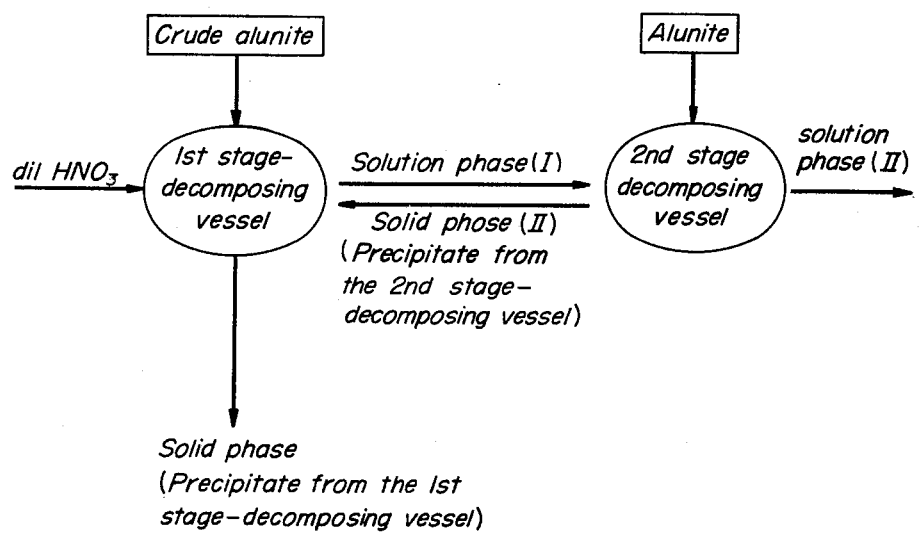

3,168,372
METHOD FOR THE RECOVERY OF GALLIUM FROM ALUNITE
Tadashi Nagumo and Masahiko Murakoshi, Tokyo, Japan, assignors to Asahi Kasei Kogyo Kabushiki Kaisha, Osaka, Japan, a corporation of Japan
Filed July 20, 1961, Ser. No. 125,428
Claims priority, application Japan, July 28, 1960, 35/32,754
1 Claim. (Cl. 23—19)

This invention relates to methods for the recovery of gallium from alunite through the countercurrent decomposition of alunite with nitric acid.

As is well known, gallium is an element the presence of which as "eka-aluminum" was predicted by Mendeleev. Gallium is similar to aluminum in nature and it is widely distributed throughout the earth's crust, as is aluminum. Few natural ores have been known which contain gallium in any appreciably concentrated form. Even germanite, which may be considered as containing gallium in its most concentrated form, only contains about 0.1 to 0.8% thereof. On the other hand, most aluminum-containing ores contain a small amount of gallium, and the average gallium content of the ores present in the earth's crust may be estimated at about 15 grams per ton. The gallium content of aluminum-containing ores generally is within the range of from 0.001 to 0.01%, and, roughly speaking, the gallium content of any aluminum-containing ore is proportional to the aluminum content of the ore. In addition to aluminum-containing ores, zinc blende and coal sometimes contain gallium but in very minute quantities.

Since the above-indicated natural sources contain gallium in such very small quantities, it is economically unfeasible to effect the direct recovery of gallium from any of the natural sources. For the industrial production of gallium, therefore, it is essential that the gallium contained in the natural sources be brought to a more concentrated state by any known concentration method. Such methods may be classified as one of the following three types:

(1) A method wherein the principal component of a starting material is removed to thereby increase the relative concentration of gallium.
(2) A method wherein a gallium-containing material is repeatedly circulated into a particular medium until a predetermined amount of gallium is accumulated therein.
(3) A method wherein gallium is combined with another material from a starting material containing gallium.

Among the industrial processes which are heretofore known, typical examples will be mentioned hereinafter with reference to each of the above-indicated types. In example of type 1 is a process wherein zinc is extracted from zinc blende, while gallium remains as a byproduct in a residue. Another example of type 1 is a process wherein England coal is burnt with gallium remaining in the flue dust. An example of type 2 is a process wherein gallium is concentrated in Bayer's solution through a circulation of this solution in a step of producing alumina from bauxite in the Bayer process. An example of the type 3 is one wherein Bayer's solution containing about 0.03 to 0.5 g./l. of gallium is electrolyzed at a mercury cathode to form gallium amalgam. As is apparent from the above methods, the gallium contained in the zinc blende residue, the flue dust, the Bayer's solution and the gallium amalgam, may be concentrated and thereafter separated from the respectively concentrated compositions.

This invention relates to a process for simultaneously effecting the manufacture of an aluminum compound, especially alumina, from alunite and the concentration of gallium in the alunite.

The process according to the invention is illustrated in the accompanying drawing wherein the treatment of alunite for the purpose of concentrating the gallium contained therein is shown.

A process of the present invention principally comprises the decomposition of alunite with nitric acid and the treatment of the resulting liquid decomposate with alunite. Generally alunite contains aluminum as a desired major component, iron as an undesired major component and gallium as a desired minor component. First, iron and gallium, both of which behave chemically differently from aluminum, can be separated from the aluminum, and then the gallium can be separated from the iron, the former behaving differently from the latter because of a great difference between the respective amounts of both.

In the decomposition of alunite with dilute nitric acid (10–60%), the resulting liquid decomposate will contain a small amount of iron if the alunite is excessive relative to the acid. This phenomenon may be due to the fact that as the reaction proceeds and the pH of the liquid increases, the iron component dissolved in the nitric acid separates in the solid phase. The iron component formed in the solid phase, however, immediately redissolves when it is treated with an excess of nitric acid. Thusly, the iron component from alunite remains in the solid phase under a relatively less acidic condition (e.g., pH 0.1–1.0) than in the liquid phase under an acidic condition (e.g., pH of less than 0.1). The gallium contained in the alunite also has substantially the same behavior as that of the iron. On the other hand, aluminum remains in the liquid phase over the pH range of from 0.1 to 1.0.

If decomposition of roasted alunite with the equivalent amount of dilute nitric acid is effected in two stages, one of which involves the further addition of dilute nitric acid and the other involves the addition of alunite, the aforementioned acid-excessive environment is realized in the first stage and the alunite-excessive environment in the second stage. Accordingly, when the two-stage reaction is interrupted, the reactive iron component from alunite remains in liquid phase in the first stage, whereas the same component remains in solid phase in the second stage. In the two-stage decomposition reaction of the present invention, a solution phase from the first stage is passed to the second stage and solution from the second stage is removed from the system, while solid phase of the second stage is returned to the first stage, whereby the reactive iron component contained in alunite is concentrated through the continuous circulation between the first stage and the second one. Gallium also is concentrated by circulation in the same manner. On the other hand, aluminum always remains in a solution phase in both the first and second stages, and this aluminum is removed from the system as a solution from the second stage. Thus, in the two-stage decomposition reaction of the present invention, aluminum can be separated from iron and gallium.

As is apparent from the foregoing description, the solution phase of the first decomposing vessel must be kept under an acidic condition. In order to have the proper ratio of dilute nitric acid to alunite, 30% dilute nitric acid is supplied during each reaction in an amount which is 100% in excess of that which is necessary for the material to be decomposed within the first decomposing vessel. The solution phase of the second decomposing vessel must be kept under a slightly acidic condition (pH about 0.1–1.0), and for this purpose, alunite to be supplied for the reaction should be in an amount of 100% in excess of that which is to be decomposed within the second decomposing vessel. Accordingly, the amount of dilute nitric acid supplied to the first decomposing vessel and that of alunite supplied to the second decomposing vessel are correlated to each other and both amounts will be determined depending on the amount of roasted alunite constituting the first charge and the concentration of nitric acid used. For instance, where the first charge of roasted alunite is 1.37 kg. and the concentration of nitric acid used is 30%, the respective amounts of alunite and nitric acid to be supplied for each reaction may be 5.0–7.10 kg. and 2.74 kg.

By repeating the above-mentioned two-stage decomposition reaction, the iron and gallium are gradually concentrated in the total system. That is, the respective concentration of iron and gallium in the solution phase in the first decomposing vessel and those in the solid phase (precipitate phase) in the second decomposing vessel are gradually increased. If the concentration of iron or gallium reaches a certain limit, the iron or gallium will cause leakage from a solution phase to a solid phase. In this case, however, the leakage of the iron component is distinguished from that of gallium in its manner. In general, the reactive iron component (such iron component as is capable of forming iron ion by decomposition with dilute nitric acid) in alunite is present in a much greater amount compared with that of gallium. (For example, alunite usually contains 0.5–3.0% $Fe_2O_3$ and 0.002–0.010% gallium.) Furthermore, the solubility of ferrous nitrate in dilute nitric acid is not as high as that of the gallium. Accordingly, when the iron component is accumulated to a certain extent (e.g., 15 g. per liter of 30% nitric acid), the concentration of the component reaches saturation, and at that time a part of said component will be insoluble even under the acid-excessive condition in the first stage, with the result that this part is excluded from the system. The thusly excluded iron component, when the two-stage decomposition reaction is repeated, becomes equal in amount to that of the reactive iron component which is supplied from alunite in each reaction, and finally the total system (solution phase plus solid phase) reaches saturation equilibrium. On the other hand, because of the absolutely small amount of gallium in alunite and the greater solubility of gallium nitrate in dilute nitric acid, gallium can be further accumulated even after the iron reaches the saturated state. (Accumulation of gallium occurs in the solution phase in the first stage and in the solid phase in the second stage.) Accordingly, after the two-stage decomposition reaction, the gallium content in the solution phase in the first decomposing vessel increases remarkably compared with that in alunite.

The two-stage decomposition reaction of the present invention is preferably continued until the system reaches saturation equilibrium with respect to iron since the efficiency for concentration of gallium is sufficiently high until this time. Where the first charge of alunite is 1.37 kg., the concentration of nitric acid is 30% and the amounts of dilute $HNO_3$ and alunite supplied each time are 7.10 kg. and 2.74 kg. respectively, the above-mentioned saturation equilibrium with respect to iron will be reached by repeating the two-stage decomposition reaction about fifteen times. Suitably the two-stage decomposition reaction may be repeated at least 10–100 times more after the saturation is established. It is, however, substantially ineffective to repeat the two-stage decomposition reaction 50 times or more, because there will be saturation of the gallium which tends to cause leakage thereof.

The iron component which leaks from the saturated solution occasionally takes gallium therewith. This leakage of gallium is unfavorable because it lowers the accumulation of gallium. In order to concentrate gallium to a higher extent, it is preferable to have the reactive iron component in alunite as small as possible. For this purpose, it is convenient to use alunite with less of the iron component ($Fe_2O_3$ 1.0% or less) and to effect deactivation of the contained iron by selection of roasting conditions. If the above conditions are met, the leakage of gallium can be made negligibly small even after iron has been accumulated to saturation. A suitable roasting condition may be 600°±10° C. for 2–3 hours.

A liquid decomposate which is the solution phase formed in the first decomposing vessel is passed to the second decomposing vessel, while a decomposition residue which is the solid phase of the first decomposing vessel is water-washed for use in the second decomposing vessel. The liquid decomposate, passed to the second decomposing vessel, is precipitated with alunite, and the solution is discharged from the second decomposing vessel, while the precipitate is returned to the first decomposing vessel.

After treatment with an excess of the ore, the liquid phase removed from the second stage includes aluminum, alkali metals, sulfuric acid and nitric acid in the solution state but is substantially free from iron, silica and others. To the liquid phase is added sulfate and potassium as required, and the resulting mixture is hydrolyzed by heating in an autoclave, whereby alunite is separated out. The separated mass is fired and then water-washed to produce alumina with a small sodium content. The thusly prepared alumina exhibits unique electric characteristics. To the above-said solution, potassium sulfate is added in an amount required to separate potassium alum, the latter being then removed to obtain a crude potassium nitrate solution. When the solution is concentrated, potassium nitrate suitable as a fertilizer can be produced. In order to produce pure potassium nitrate, lime and calcium nitrate are added to a crude potassium nitrate solution to remove therefrom aluminum and the majority of sulfate, and then the remaining solution is concentrated. If it is required to have even more pure potassium nitrate, a solution of somewhat less pure potassium nitrate is added with a small amount of alkali carbonate to remove calcium and then the remaining solution is recrystallized.

Potassium alum can be decomposed with ammonia gas to yield aluminum hydroxide and ammonium sulfate-potassium sulfate mixed liquid.

It is very interesting to note that gallium can be recovered in high yield in the process of decomposing alunite with nitric acid to produce alumina, potassium alum, potassium nitrate and the like.

The following examples will serve to show the nature of the present invention in detail.

*Example 1*

For preparation of a starting material, alunite obtained from Ukusu, Shizuoka Prefecture (which contains $Al_2O_3$ 35.03%; $Fe_2O_3$ 1.51%; $SiO_2$ 15.14%; $K_2O$ 4.00%; $Na_2O$ 1.54%; $SO_3$ 40.58%; and Ga 0.0035%) is fired for two hours at 600° C.±10° C.

The fired alunite is subjected to decomposition with nitric acid and to removal of iron in the batch type operations respectively in a first decomposition vessel and a second decomposition vessel, while the solution phase and the precipitate phase are countercurrently contacted with each other.

Into the first decomposition vessel, 30% nitric acid is fed each time in an amount of 7.10 kg., which serves to decompose the residue coming from the second decomposition step each time. However, for the first reaction, there is no residue coming from the second decomposition vessel and instead 1.37 kg. of alunite is fed into the first decomposition vessel. For each operation, a temperature of 109° C. and a stirring period of 1.5 hours are realized in the decomposition vessel. After decomposition, red sludge is filtered, and the solution is passed for use in the second decomposition stage and the red sludge is washed with water and passed to the second stage. Into the second decomposition vessel, 2.74 kg. of alunite are introduced each time and treated with the liquid decomposate coming from the first decomposition step each time. In this vessel, a temperature of 104° C. and a stirring period of 0.5 hour are provided. The resulting mixture has a pH of 0.3–1.0, and is filtered and water-washed, and then returned for use in the first decomposition vessel. The washing is combined with that of the liquid decomposate transferring from the first decomposition vessel to the second one.

The above-indicated operation including the two-stage decomposition reaction is repeated thirty times. The final nitric acid solution, 7.91 liters, taken from the decomposition vessel is found to contain 1.64 g. of gallium in a dissolved state. This gallium content corresponds to about 70% of the weight (2.38 g.) of the gallium in alunite which is soluble in nitric acid, and this indicates that the concentration of gallium according to the present method is about 20 times more efficient than that according to a simple decomposition method as shown in the prior art.

The nitric acid solution also contains 135.0 g. of iron which correspond to 15.5% of the total iron (869 g.) in the ore. This means that about 70% of gallium is accumulated in the reaction system while aluminum and the major proportion of iron are excluded from the system.

*Example 2*

In this example, the two-stage decomposition reaction is carried out under the following conditions:

Decomposing vessels: 15 ton volume, stainless steel-vessel, steam-heated and equipped with reflux condensor or stirrer (80 r.p.m.)

The first charge to the first decomposing vessel:
    Alunite: 1.37 kg.
    30% $HNO_3$: 7.10 kg.

The amount charged for each period of reaction:
    1st stage: 30% $HNO_3$, 7.10 kg./each time
    2nd stage: Alunite, 2.74 kg./each time pH condition:
    The 1st decomposing vessel (about 15% as free $HNO_3$ concentration), $\ll 0.1$
    The 2nd decomposing vessel, 0.1–1.0

The experimental results are shown in table below.

| Times of decomposition reaction | Solution in the 1st decomposing vessel | |
|---|---|---|
| | Fe (g./l.) | Ga (mg./l.) |
| 1 | | 6.6 |
| 5 | | 40.4 |
| 10 | 5.20 | 96.0 |
| 15 | | 137.0 |
| 20 | | 168.0 |
| 25 | | 188.0 |
| 30 | 17.10 | 208.0 |

What we claim is:

A process for concentrating gallium contained in alunite ore in a two-stage countercurrent decomposition system by successively repeating the decomposition of alunite with nitric acid in successive decomposition periods, said process comprising: initially mixing in a first decomposition zone nitric acid of between 10 and 60% concentration with a charge of roasted alunite, at a temperature of about the boiling point, the amount of nitric acid added being in excess of that which is to be decomposed in the first decomposition zone and being controlled to keep the pH of the mixture less than 0.1, the mixing being effected for at least one hour and until gallium contained in the alunite is dissolved in the nitric acid solution, separating a solid phase and a liquid phase in the first zone, transferring from the first zone the liquid phase which is enriched with gallium to the second decomposition zone where the liquid phase is mixed with an amount of roasted alunite ore, which is in excess of that to be decomposed in the second decomposition zone to maintain the pH of the mixture between 0.1 and 1.0, until the gallium contained in the liquid phase from the first zone as well as the gallium contained in the ore is precipitated, separating in the second zone a liquid phase weak in gallium from a solid phase which is enriched with gallium, discharging the liquid phase from the second zone while the solid phase is returned to the first decomposition zone, wherein only nitric acid of between 10 and 60% concentration is added in a quantity in excess of the solid phase which is to be decomposed in the first zone to keep the pH of the mixture less than 0.1, the mixing being effected for at least one hour at a boiling temperature, until gallium is dissolved in the nitric acid solution, separating a solid phase and a liquid phase in the first zone and transferring the liquid phase which is enriched with gallium to the second decomposition zone, the process being repeated until gallium is concentrated to a predetermined concentration, whereafter the gallium is removed.

References Cited by the Examiner

UNITED STATES PATENTS

| | | | |
|---|---|---|---|
| 1,792,410 | 2/31 | Buchner | 23—142 |
| 2,019,553 | 11/35 | Willmore et al. | 23—141 |
| 2,574,008 | 11/51 | Beja | 23—140 |

OTHER REFERENCES

Ser. No. 426,648, Van Es et al. (A.P.C.), published Apr. 27, 1943.

MAURICE A. BRINDISI, *Primary Examiner.*